United States Patent
Krosta et al.

(10) Patent No.: US 7,404,786 B2
(45) Date of Patent: Jul. 29, 2008

(54) PROCESSING MACHINE ARRANGEMENT WITH A ROBOT AND A TOOL MAGAZINE

(75) Inventors: Carsten Krosta, Aalen (DE); Ralf Müllner, Ostfildern (DE); Stefan Hansch, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 178 days.

(21) Appl. No.: 11/446,775

(22) Filed: Jun. 5, 2006

(65) Prior Publication Data
US 2007/0087924 A1    Apr. 19, 2007

(30) Foreign Application Priority Data
Jun. 18, 2005    (DE)    ........................ 10 2005 028 358

(51) Int. Cl.
*B23Q 3/157*    (2006.01)

(52) U.S. Cl. ............................................. 483/1; 483/16

(58) Field of Classification Search ...................... 483/1, 483/38, 62, 16, 30, 31, 58; 901/30, 31, 41, 901/42, 14, 15, 16
See application file for complete search history.

(56) References Cited

U.S. PATENT DOCUMENTS

| | | | | |
|---|---|---|---|---|
| 4,344,221 A | * | 8/1982 | Pagani | 483/8 |
| 4,587,716 A | * | 5/1986 | Bytow | 483/14 |
| 4,635,342 A | * | 1/1987 | Balding | 483/7 |
| 4,637,121 A | * | 1/1987 | Wortmann | 483/16 |
| 4,831,714 A | * | 5/1989 | Babel et al. | 483/3 |
| 4,883,939 A | * | 11/1989 | Sagi | 483/901 |
| 5,281,194 A | * | 1/1994 | Schneider | 483/14 |
| 5,462,511 A | * | 10/1995 | Sheldon et al. | 483/1 |
| 5,702,336 A | * | 12/1997 | Kameyama | 483/56 |
| 5,879,277 A | * | 3/1999 | Dettman et al. | 483/59 |
| 6,010,441 A | * | 1/2000 | .ANG.gren | 483/1 |
| 6,021,361 A | * | 2/2000 | Taninaga et al. | 483/31 |

(Continued)

FOREIGN PATENT DOCUMENTS

DE    299 02 127 U1    8/2000

(Continued)

OTHER PUBLICATIONS

Office Action from the German Patent Office dated Jan. 31, 2006 (2 pages).

*Primary Examiner*—Dana Ross
(74) *Attorney, Agent, or Firm*—Flynn, Thiel, Boutell & Tanis, P.C.

(57) ABSTRACT

A processing machine arrangement includes a processing machine with at least one tool spindle and with a tool magazine for offering tools to the processing machine for the machining of a workpiece. A method for the operation of such a processing machine arrangement is also provided. There is a robot with a multi-joint robot arm for providing the tool magazine with tools from a tool storage supply means and for removing spent tools from the tool magazine, and that the tool magazine includes a tool holder portion which is alternatingly able to be shifted, and more especially pivoted, into a robot access space for a tool change of the robot and into a spindle access space for a tool change on the tool spindle, with the tool holder portion having a tool holder for holding a tool.

26 Claims, 8 Drawing Sheets

U.S. PATENT DOCUMENTS 7,217,229 B2 * 5/2007 Hagihara et al. ............... 483/16

FOREIGN PATENT DOCUMENTS

| | | |
|---|---|---|
| DE | 299 23 817 U1 | 7/2001 |
| DE | 102 02 970 A1 | 8/2003 |
| EP | 1004393 A2 * | 5/2000 |
| JP | 08187640 A * | 7/1996 |

* cited by examiner

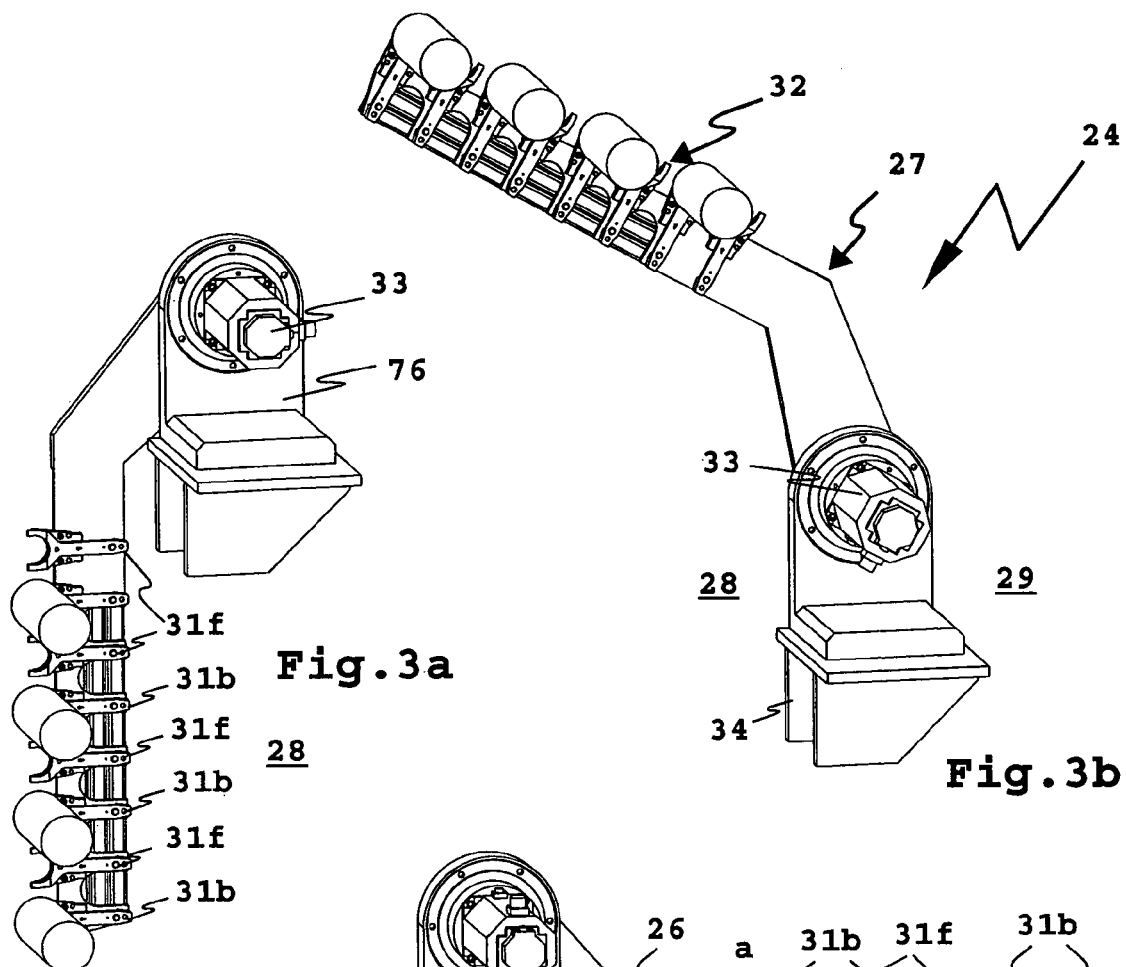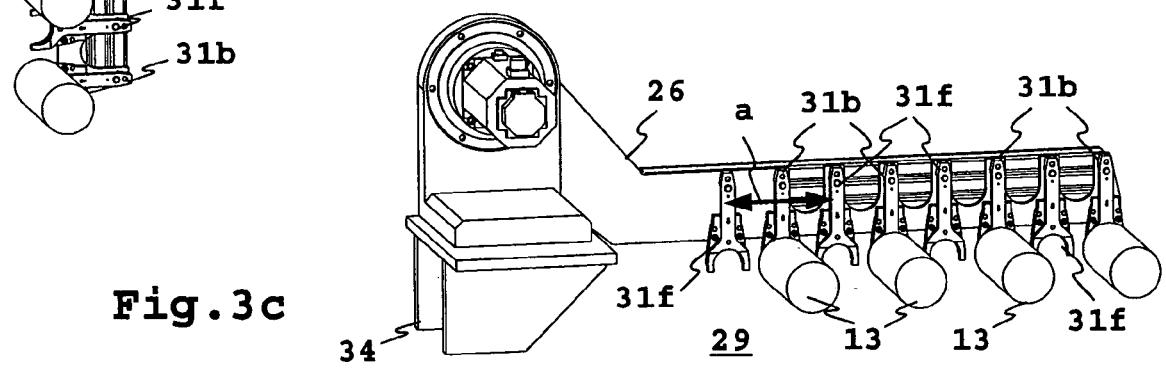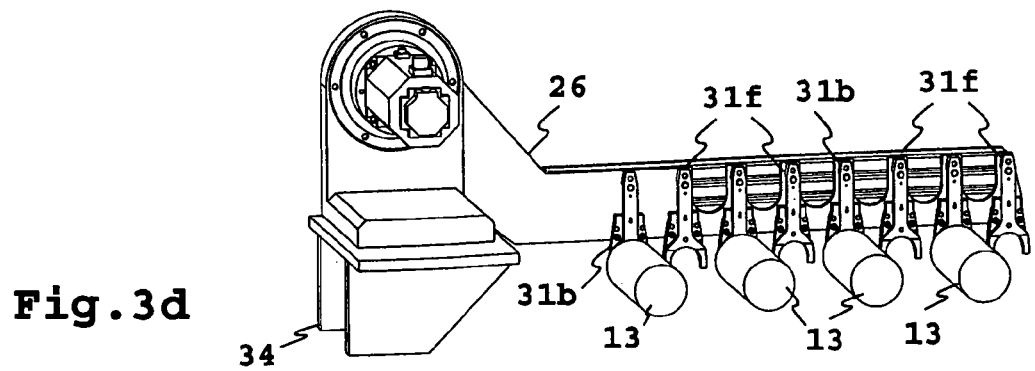

PROCESSING MACHINE ARRANGEMENT WITH A ROBOT AND A TOOL MAGAZINE

BACKGROUND OF THE INVENTION

The invention relates to a processing machine arrangement comprising a processing machine with at least one tool spindle and with a tool magazine for offering tools to the processing machine for the machining of a workpiece and to a method for the operation of such a processing machine arrangement.

THE PRIOR ART

In the processing machine or machine tool art, as for example turning, milling and/or drilling machines it is a known practice to offer and supply tools such as drills, turning tools or the like with the aid of chain magazines. If a plurality of tools is necessary, for example for complex processing of workpieces and/or for a multi-spindle processing machine, which are to be fitted with tools, the chain magazines must have a large capacity. The chain is accordingly increased in length so that in the case of many machine it must meander in order to have a sufficient longitudinal capacity. A large capacity chain magazine requires much space and is heavy. Furthermore the speed of tool changing is reduced in the case of a large chain length. In a scenario in which two necessary tools are held ready, f. i. at opposite sections of a bidirectional travelling chain, the chain, the chain must be shifted through distance equal to half its length for changing. In the case of along chain this involves a significant impairment as regards the time needed for tool provision.

SHORT SUMMARY OF THE INVENTION

One object of the present invention is accordingly to improve a tool change in the case of a processing machine arrangement of the type initially mentioned.

In order to achieve these and/or other objects appearing from the present specification, claims and drawings, in the present invention a processing machine arrangement of the type initially mentioned is such that it comprises a robot with a multi-joint robot arm for providing the tool magazine with tools from a tool storage supply means and for removing spent tools from the tool magazine, and that the tool magazine includes at least one tool holder portion which is alternatingly able to be shifted, and more especially pivoted, into a robot access space for a tool change of the robot and into a spindle access space for a tool change on the at least one tool spindle, such tool holder portion having at least one tool holder for holding a tool. Furthermore, for attaining the object of the invention, a method is provided for the operation of such a processing machine arrangement in accordance with a further independent claim as a subcombination in its own right.

In the case of the processing machine it is preferably a question of a machine for machining workpieces, as for example a milling and/or drilling and/or turning machine or lathe. The tool are turning tools, drills, milling tools or the like.

A basic principle of the invention is depositing a plurality of tools, which are required by the processing machine, in the tool storage supply means. The robot retrieves such respectively required tools from such supply means using a multi-joint robot arm and supplies the tool magazine, which is substantially smaller in comparison with the tool storage supply means, on the processing machine. The at least one spindle—several spindles may be provided—retrieves the tools from the tool magazine for machining the workpieces. The tool magazine is able to be pivoted between a robot access space and a spindle access space so that the tool holding portion is able to be shifted speedily into the respective access space for the robot or, respectively, the at least one spindle. The small and compact tool magazine, which may be a small chain magazine, a disk magazine with for example 40 to 60 tool holders, a pivotal arm arrangement or the like, constitutes a small, high-speed intermediate buffer or intermediate store for offering tools to the spindle(s). The tool magazine has for example only 10 to 30% or less of the storage capacity of the storage magazine. The term pivotal herein includes rotary as well, so that not only a reciprocating but also a rotary movement is possible in principle.

Preferably several tool holders are present in the tool holder portion, which are preferably arranged in pairs. In the case of a pair of tool holders firstly one tool holder is free so that here the robot or the at least one spindle can deposit a tool and after a relative movement of the robot or, respectively, of the spindle toward the other tool holder of the tool holder pair, which offers or provides a tool, may pick up such tool. The at least one spindle and the robot deposit a tool at the free tool holder and retrieve another tool from the offering tool holder. The two tool holders are preferably arranged directly adjacent to one another. For a multi-spindle processing machine an arrangement is thus created, for example, in which in alternating succession one tool holder is free and one tool holder is occupied. It is only during the short phase of tool changing in the robot access space or, respectively, the spindle access space that both tool holders of a pair of tool holders are briefly occupied with tools.

The tool holder pair or pairs may be arranged in an adjustable fashion on a base part of the tool magazine in order to position the free tool holder or, respectively, the occupied tool holder in relation to the at least one spindle. Preferably however there is a positionability of the tool spindle(s) in order to shift the free tool holder or, respectively, the offering tool holder occupied by a tool.

The tool magazine preferably includes at least one rotary adjustment means for rotating and/or at least one linear shifting means for linear setting of the at least one tool holder portion. Accordingly a sequential or combined rotary and translatory adjustment in position may take place.

The tool holder portion is preferably arranged on an essentially dimensionally stable base part. The at least one base part preferably comprises at least one pivotal arm on which the tool holder portion is arranged. The pivotal arm is able to be reciprocated into the robot access space and into the spindle access space and vice versa. The base part is preferably rotary, i. e. also able to be pivotally shifted in order to pivot the tool holder portion between the robot access space and the spindle access space. Linear mobility is also an advantage.

Preferably the tool holder comprises at least two tool holder portions able to be shifted in alternating succession into the robot access space and the spindle access space with one or more tool holders. Accordingly the tool spindle and the robot may change tools in their respective access space simultaneously or at least substantially so. Accordingly tool changing is accelerated.

For the at least two tool holder portions, able to be alternatingly shifted into the access spaces two designs are possible, further constructional modifications also being possible.

For instance the two tool holder portions may be arranged on a first and a second pivotal arm, which are able to be pivoted in opposite directions into the robot access space and into the spindle access space. Preferably the two pivotal arms are able to be linearly positioned in relation to each other so that the two pivotal arms may get out of each other's way during opposite movement. At least one of the pivotal arms performs a linear dodging motion in relation to the other pivotal arm so that space for maneuver is provided and the two pivotal arms do not collide when they are substantially in the same angular position. In this respect it is to be taken into account that the linear path of motion is to be so large that any tools arranged on the pivotal arms do not collide with the other pivotal arms or with tools on the other pivotal arm.

In principle it would be possible to design both pivotal arm for linear movement, a simple and convenient modification providing for only one of the two pivotal arm to be linearly movable.

The linear mobility of the two pivotal arms can be appropriately exploited for a further purpose: the pivotal arms may namely then travel into substantially identical tool changing positions, for example for the tool spindle(s) within the spindle access space and/or for the robot within the robot access space. The spindle or spindles can then be positioned respectively at the same position during tool changing, independently of which pivotal arm is just providing tools. The same applies essentially for the robot. In this connection it is however to be noted that owing to their comparatively free positionability robots do not always require the same tool accepting position. The programmer's task for the robot is however simplified by the same tool position within robot access space, because the robot does not, as it were, have to go figure which pivotal arm is currently in the robot access space for tool changing.

The second pivotal arm is preferably cranked. A cranked section runs past in a bearing for rotation, which for example comprises a rotary drive, of the first pivotal arm so that the tool holders of the first and the at least one second pivotal arm may assume essentially the same tool changing positions. The cranked section compensate a linear offset caused by the rotary bearing or, respectively, the rotary drive. The two pivotal arms may share the same axis of rotation or more particularly parallel adjacent axes of rotation close to each other.

The at least two tool holder portions able to be brought into the robot access space and the spindle access space may in accordance with another design of the invention, may be different portions of a rotary holding means, same being able to be rotated or, respectively, pivoted simultaneously, during a rotary or pivotal movement, into the robot access space or, respectively, into the spindle access space. The holding means is for example a disk or a disk-like base part. The holding means has for example a polygonal and preferably quadrilateral outline. This design of the invention is more particularly convenient in the case of multi-spindle machines. In principle however round outlines are possible for the base part, for example for use with single spindle machine.

The tool magazine is preferably arranged on a frame of the processing machine. Accordingly the tool magazine constitutes a component of the processing machine.

In accordance with a particularly preferred embodiment of the invention the processing machine is a multi-spindle machine having at least two tool spindles arranged along a line, and more particularly a straight line, adjacent to one another. The tool spindles are for instance grouped in a horizontal or a vertical axis adjacent to each other or superposed in relation to each other. The tool holder portion(s) of the tool magazine have tool holders grouped along a line of the adjacently placed tool spindles so that the tool spindles may simultaneously take tools from the tool holders and deposited them there. This speeds up operation. It will be clear that the tool spindles may be shifted along a straight or zigzag line, an arc, a polygonal line or the like adjacent to each other, in a superjacent relationship or grouped in some other way.

A tool holding means is preferably arranged on the robot, which in accordance with the grouping of the tool spindles possesses tool holders arranged adjacent to one another. Thus the robot can simultaneously take several tools from the tool holders of the tool magazine deposit same there. This speeds up tool changing.

The storage supply means comprises at least one frame, which preferably has a cabinet-like configuration in order to store tools. Preferably several frames or tool cabinets are grouped in a ring around the robot so that the multi-jointed robot arm can take hold of the tools in the frames of and deposit them there. The frames may however also be arranged along at least one row line adjacent to each other and/or in tandem.

In the case of the frame(s) preferably a plurality of tool holder groups are present, in the case of which tool holders are provided in accordance with the grouping of the tool spindles of the multi-spindle machine, for example as tool holders arranged alongside each other on the line. Using its tool holding means the robot arm can simultaneously retrieve, several tools from the tool holders or deposit same again. In this connection it is to be mentioned that the holder groups may conveniently have adjacently placed free sites and occupied sites, more particularly arranged in alternating succession so that the deposit and retrieval of the tools may be implemented with short paths of movement by the robot.

The robot is arranged in a robot working space toward which the at least one frame is open at the front and accessible for the robot. The frame is preferably closed at the back so that an operator is stopped from putting his hand in the robot working space. The frame or, respectively, the frames of the supply storage means advantageously constitute a component of an enclosure of the robot working space.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIGS. 3a through 3d illustrate a pivoting operation of the pivotal arm of the processing machine arrangement in keeping with FIGS. 1 and 2.

Figure 1:
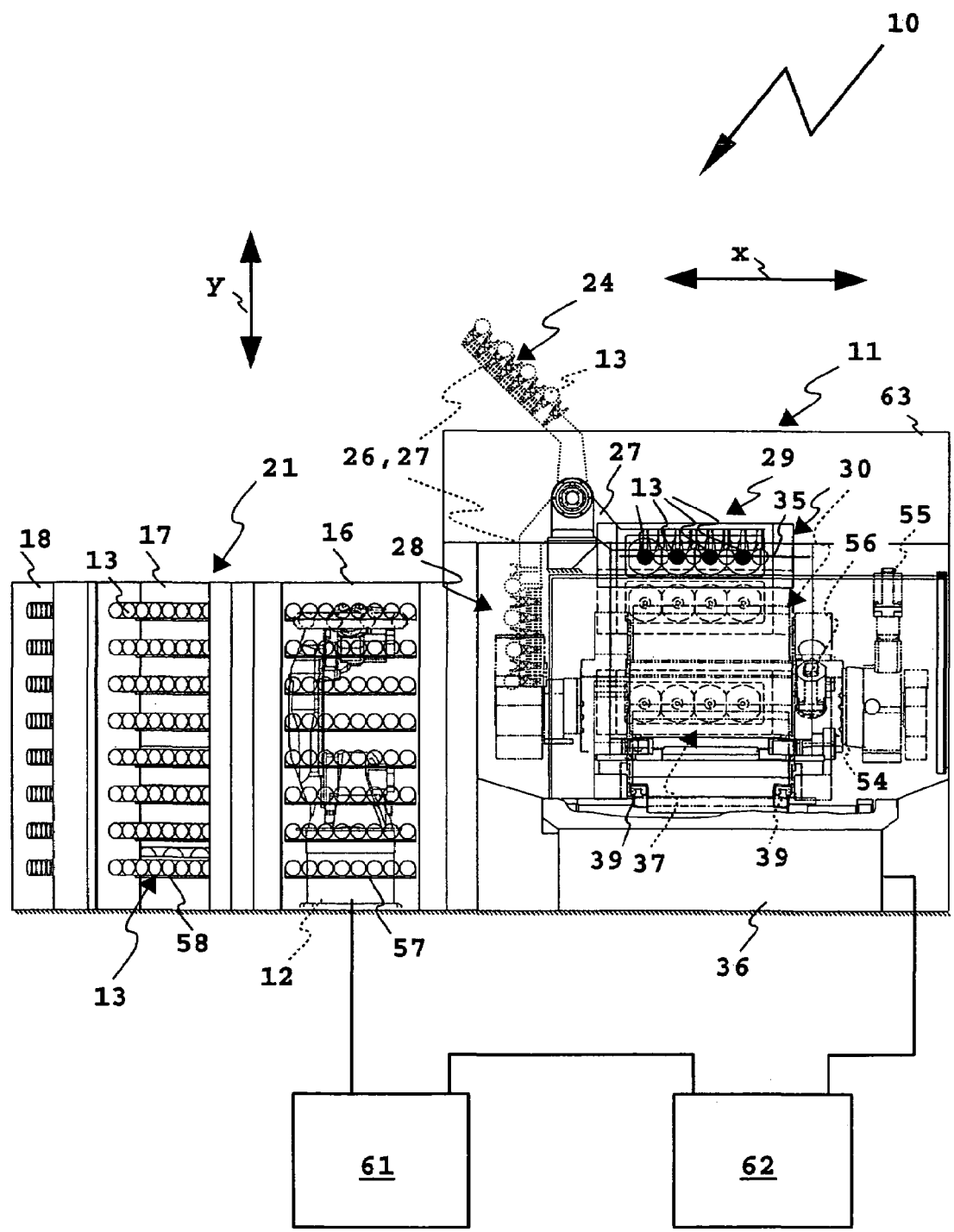
FIG. 1 shows a processing machine arrangement in accordance with the invention with one robot, one multi-spindle processing machine with horizontally arranged spindles and one tool magazine and the processing machine with a pivotal arm as seen from the front.
Figure 2:
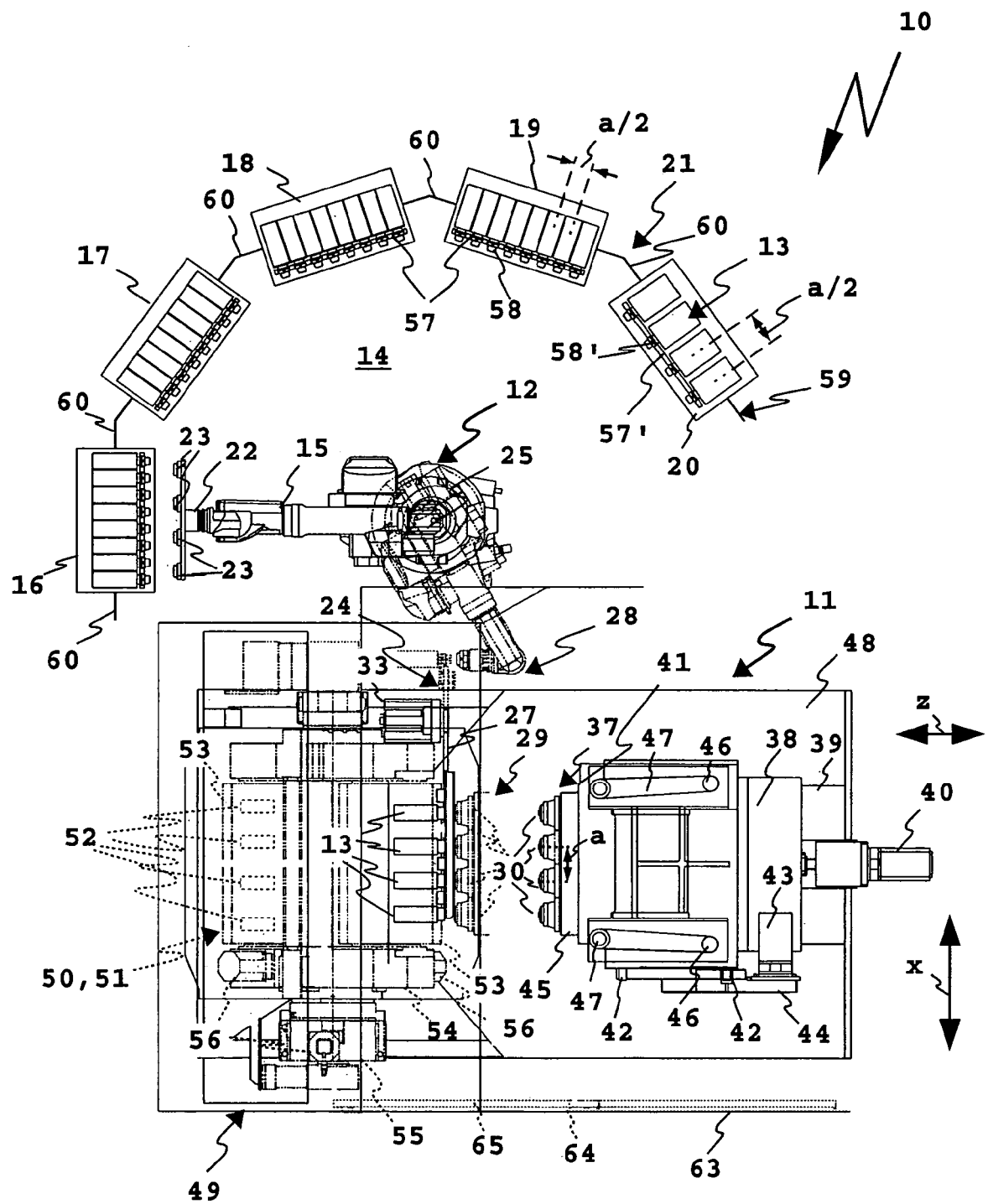
FIG. 2 shows the processing machine arrangement in accordance with FIG. 1 from above.
Figure 4A:
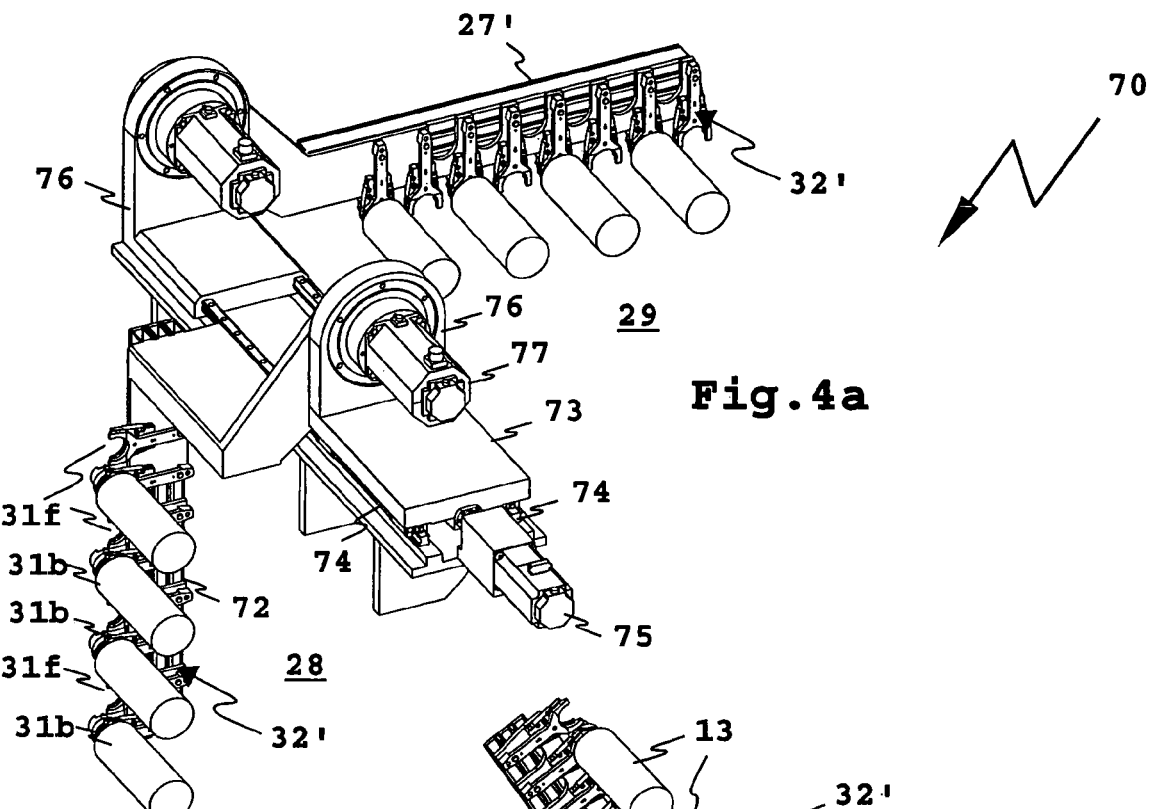
FIGS. 4a through 4d show a second working example of a tool magazine in accordance with the invention with two pivotal arms during an oppositely directed pivoting operation.
Figure 4B:
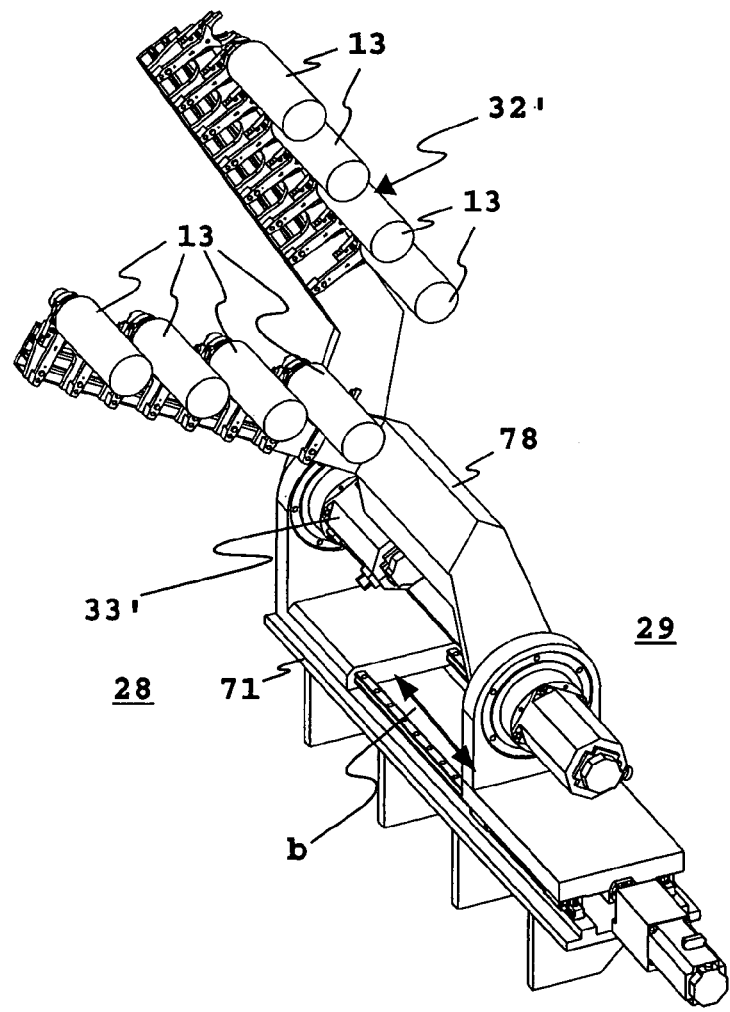
Figure 4C:
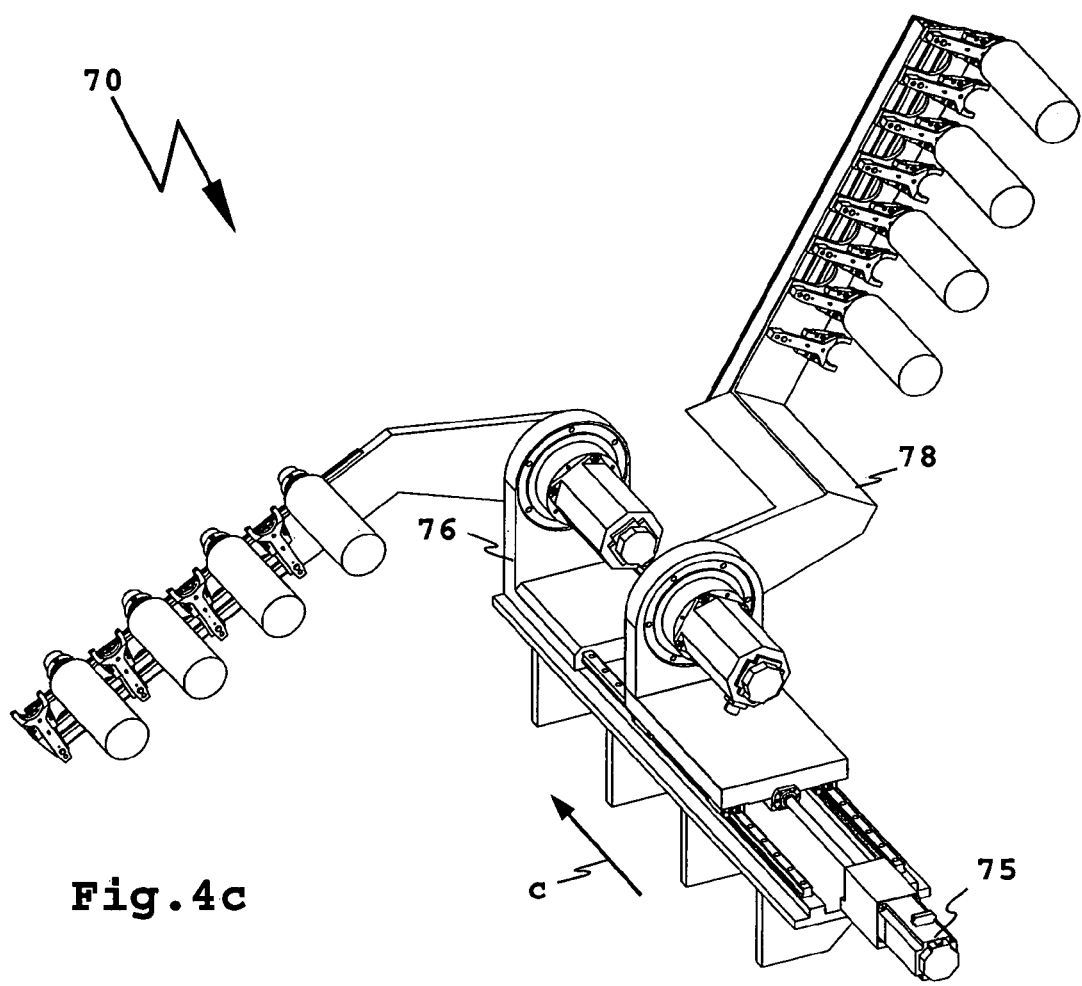
Figure 4D:
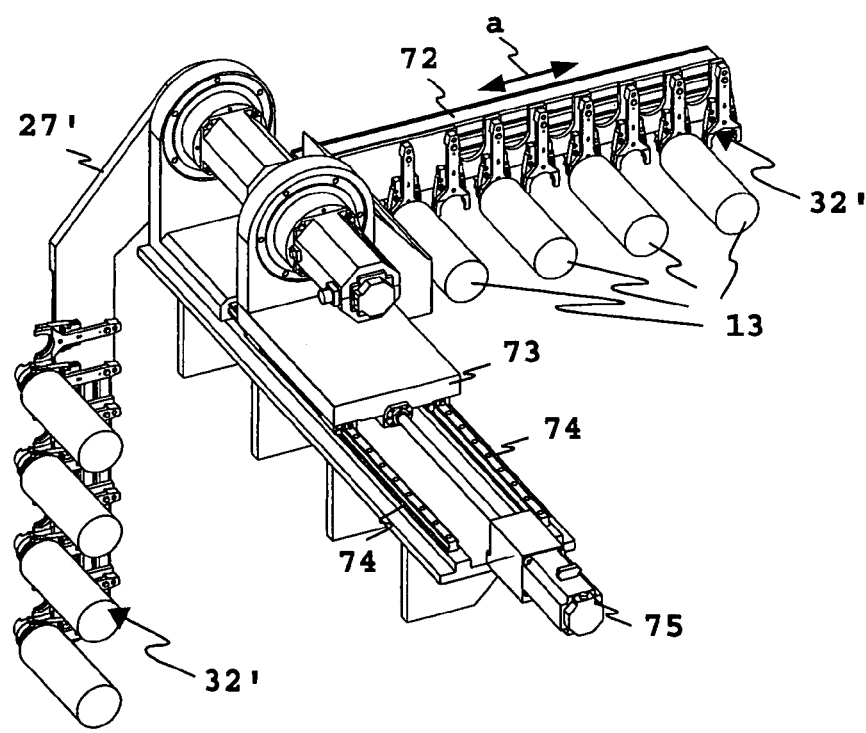
Figure 5A:
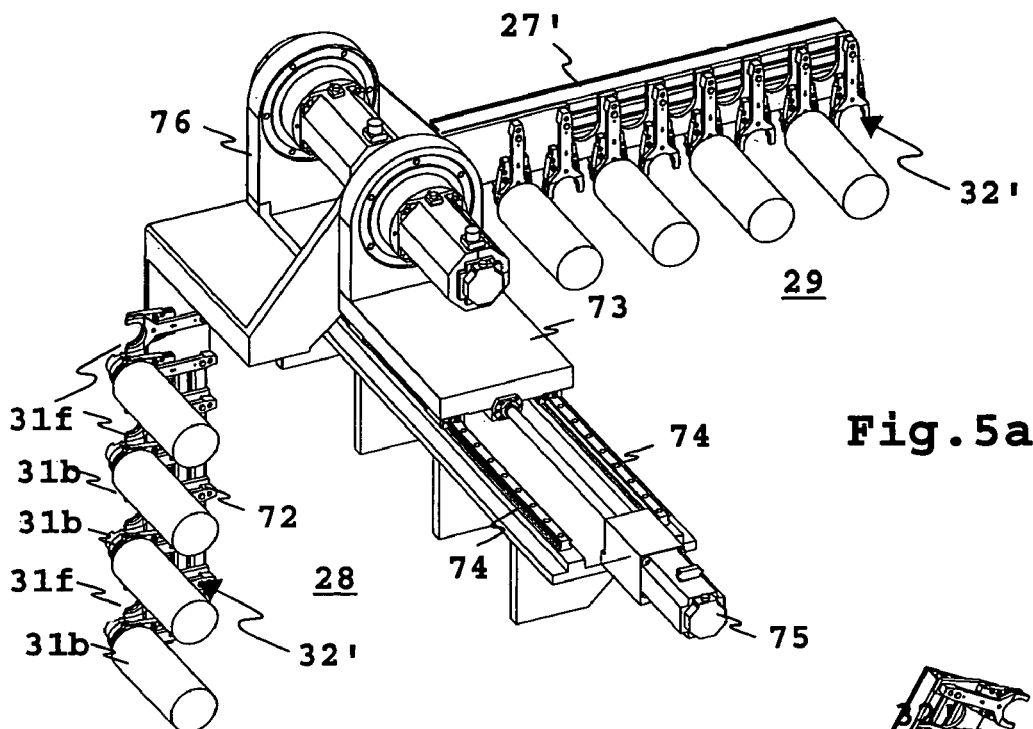
Figure 5B:
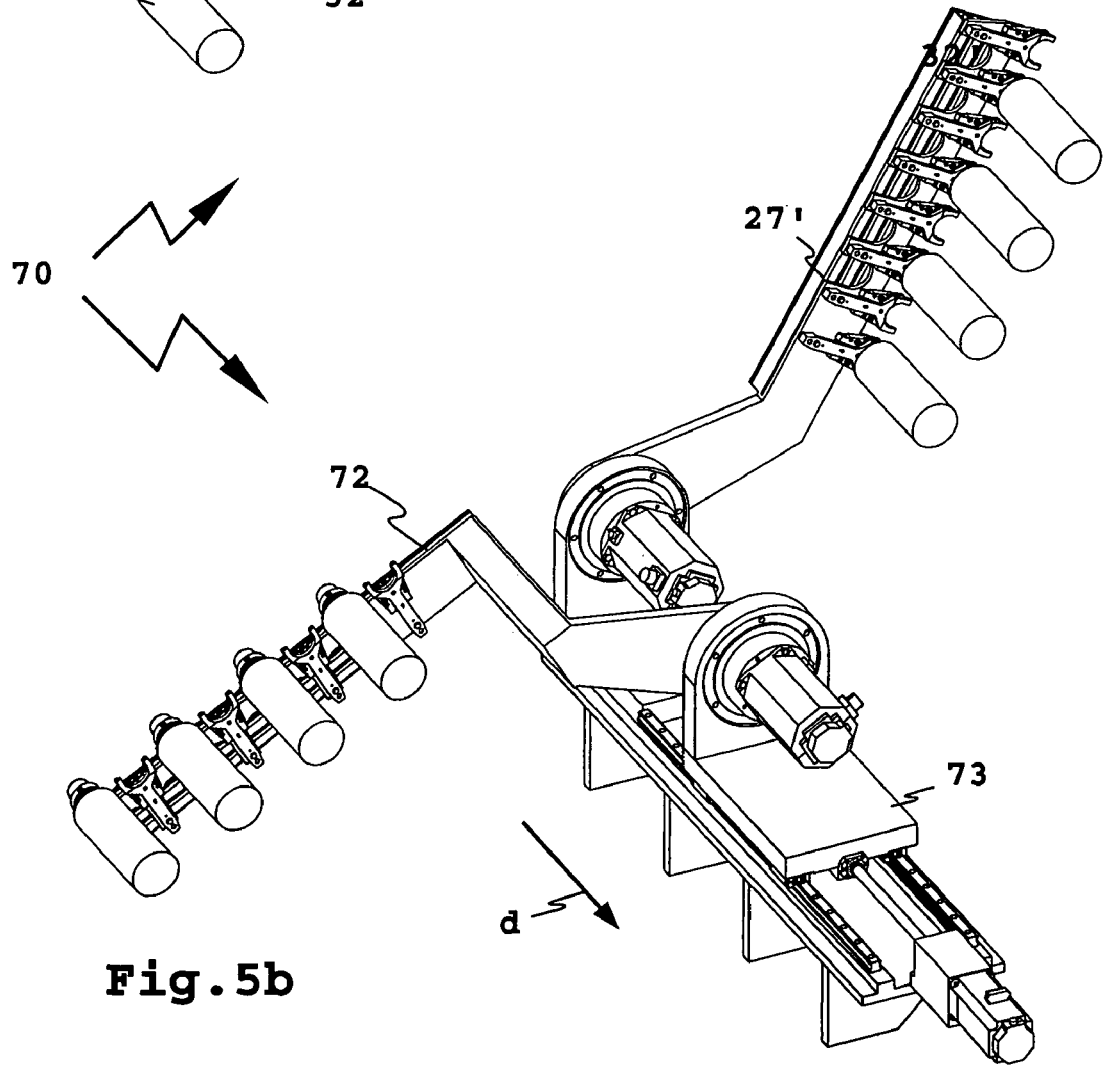

FIGS. 5a and 5b show a further development of the tool magazine in accordance with FIGS. 4a through 4d with an additional linear travelling movement at a robot access space for the robot in accordance with FIGS. 1 and 2.

Figure 6A:
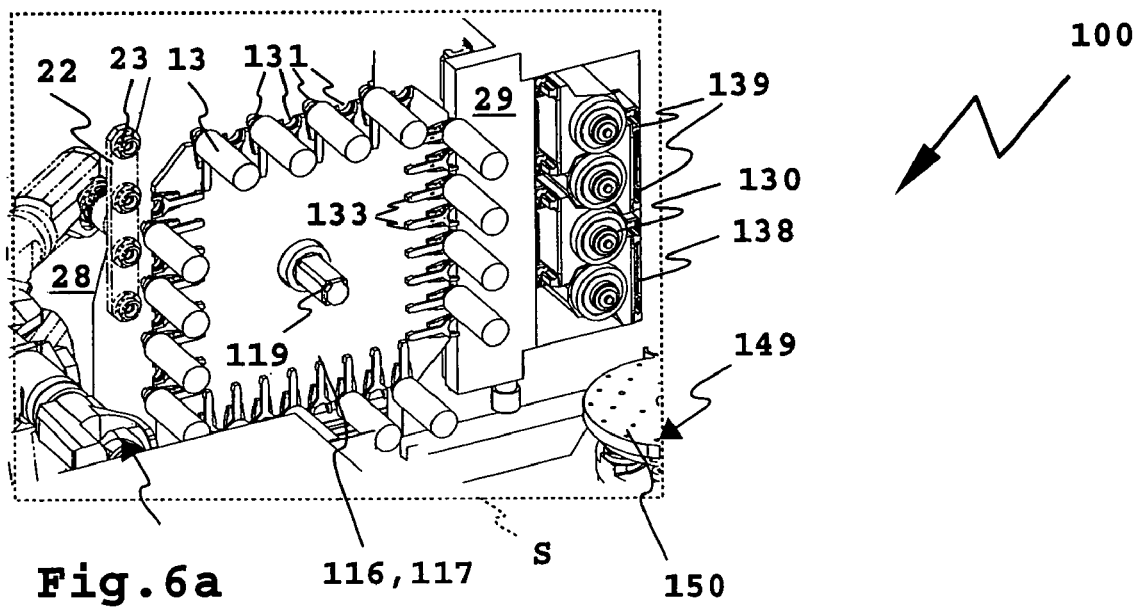
Figure 6:
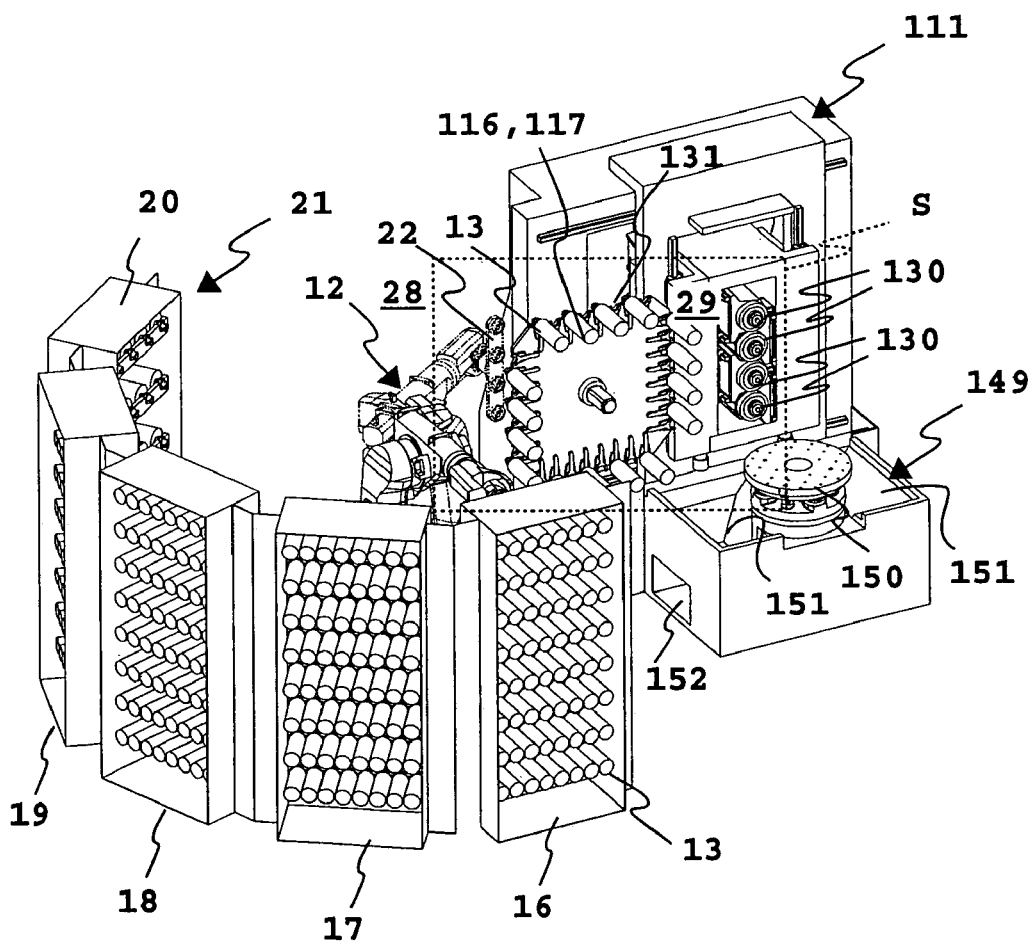

FIG. 6 shows a second working embodiment of a processing machine arrangement in accordance with the invention having a disk- or plate-like rotary tool magazine looking in direction obliquely from above.

FIG. 6a shows the part S of the showing of FIG. 6.

Figure 7:
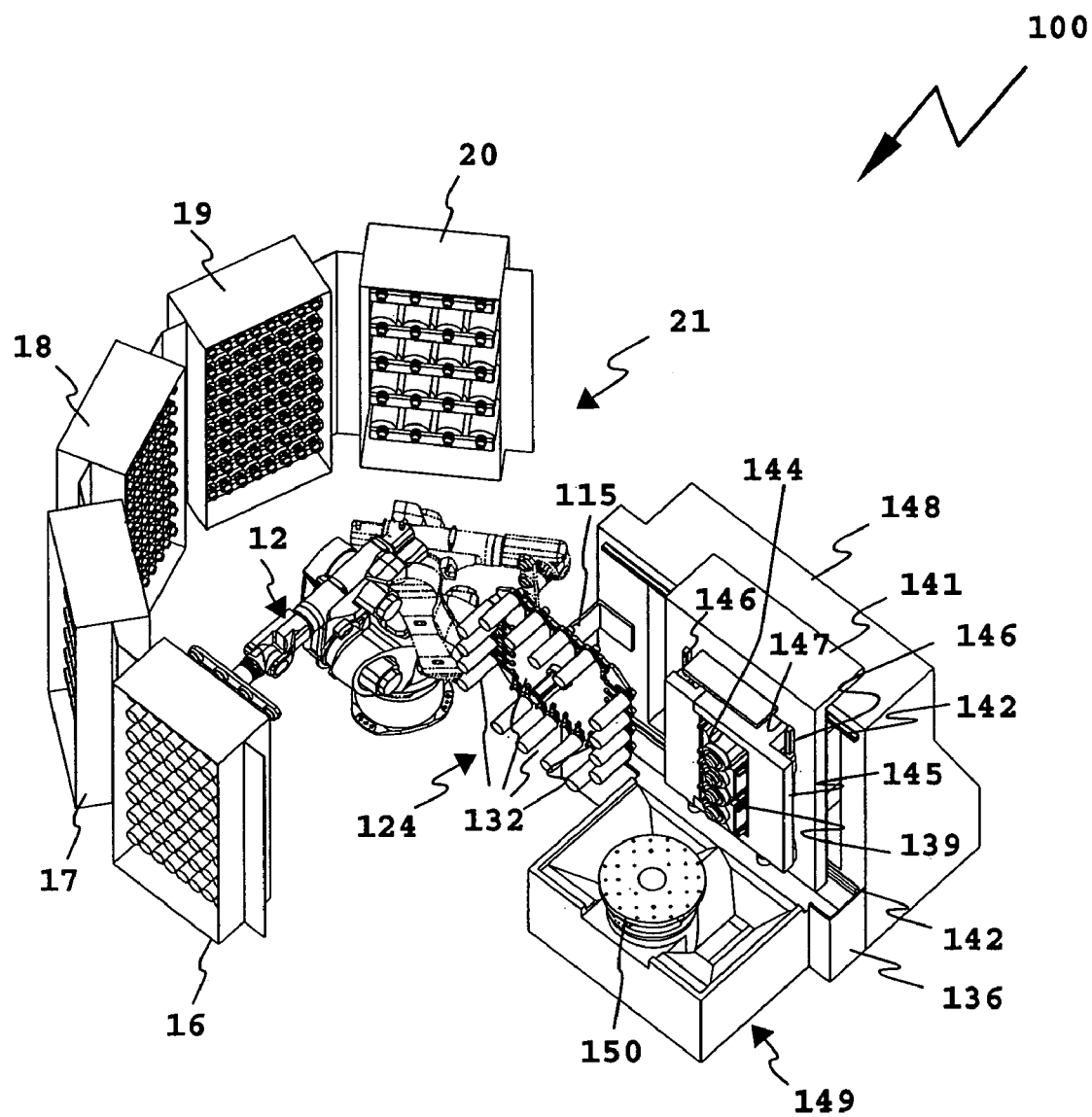

FIG. 7 shows a further perspective elevation looking obliquely downward, of the processing machine arrangement in accordance with FIG. 6.

DETAILED ACCOUNT OF WORKING EMBODIMENTS OF THE INVENTION

A processing machine 11, for example a milling and/or drilling and/or turning machine more especially for machining metallic workpieces in a processing machine arrangement 10 is served by a robot 12 with tools 13. The robot 12 is able to move within a robot working space 14 and using its multi-joint robot arm 15 gets the tools 13 from frames 16 through 20 of a supply storage means 21 and deposits spent or used tools 13 in the frames 16 through 20. Using a tool holding means 22, which in the present example comprises four tool holders 23, the robot 12 retrieves a plurality of tools 13, in the present case a maximum of four, simultaneously from one of the frames 16 through 20. Then the robot 12 moves the retrieved tools 13 to a tool magazine 24 on the processing machine 11. When doing this the robot shifts its arm 15 and turns, for example about a vertical axis 25, until it has reached the tool fitting position, indicated in chained lines, for arming the tool magazine 24 with tools 13.

A base part 26 in the form of a pivotal arm 27 of the tool magazine 24 is able to be pivoted between a robot access space 28, where the robot 12 has access to the pivotal arm 27, as for example in the fitting or arming position indicated in chained lines in FIG. 2, and a spindle access space 29 for tool changing at one or more tool spindles 30 of the processing machine 11. The tool magazine 24 takes new tools 13, offered by the robot 12, with tool holders 31 at a tool holder portion 32 of the pivotal arm 27. The tool holders 13 are in the present case bifurcated, though differently shaped receiving means such as grippers, receiving rings or the like would certainly be possible. Then the pivotal drive 33, which is arranged on an upwardly projecting holding section 76 of a holder 34, rocks the base part 26, mounted in rotatable manner on the holder 34, into the spindle access space 29. The pivotal drive 33 constitutes a rotational placing means.

In the FIGS. 3a through 3d different pivotal positions are illustrated, FIG. 3a for example showing the pivotal arm 27 in the robot access space 28, and FIG. 3b showing the pivotal arm in the course of its pivotal motion toward the spindle access space 29, where the pivotal arm 27 is depicted adjoining in FIGS. 3c and 3d. It will be clear that a complete rotary movement is possible too, if sufficient space for motion is present and is considered in accordance with the invention as a pivotal movement. In the spindle access space 29 the spindles 30 firstly deposit spent tools 13, for example tools 13 colored black in FIG. 1, at the tool holder portion 32 and retrieve fresh tools 13, represented in FIG. 1 in outline, for further machining of the workpieces.

The processing machine 11 is a multi-spindle machine tool, which in the specific case possesses four tool spindles 30 arranged along a line or, respectively, the row axis 35 horizontally adjacent to each other. In relation to a machine bed 36 the spindles 30, which together constitute a spindle arrangement or spindle group 37, may travel horizontally in the X direction parallel to a line 35, and in the Z direction normal to the line 35 and vertically in the Y direction. A horizontal slide 38, which runs on guides 39 of the machine bed 36, moves in the Z direction and is positioned forward and backward by a drive 40, for example a circulating ball drive or a linear direct drive in the Z direction. On the Z slide there is a horizontally travelling slide 41 moving in the X direction which runs on guides 42. A drive 43 propels the X slide 41 with the aid of a transmission 44. On the X slide a vertical or Y slide 45 runs and holds the spindle arrangement or spindle group 37. The horizontal slide 41, which for example is tower-like in design, surrounds the vertical slide 45 in accordance with a convenient modification of the invention like a frame. Drives 45 move the Y slide 45 with the aid of transmissions 47.

In front of the spindle group 37 and, respectively, the machine frame 48 there is a processing station 49 with a workpiece changer 50. The workpiece changer 50 comprises, for example, a pivoting workpiece holding means 51 for offering workpieces 52 for processing or machining by means of spindles 30. Two workpiece holding means orientated in the direction of the row axis or line 35 of the spindles 30, workpiece palettes 53, are rotatably supported on pairs 54 of pivotal arms. The pairs 54 of pivotal arms are for their part in turn mounted pivotally on lateral pivotal holding means 55, which extend upward in the front part of the base frame or, respectively, machine bed 36. Drives 56 on the workpiece palettes 53 or, respectively, on one of the pivotal holding means 55 position the workpiece palettes 53 using suitable pivotal movements in front of spindles 30 so that same may be machined by them. On the workpiece palette 53, which is respectively not pivoted in front of the spindles 30, workpieces 52 may be changed in the course of machining. It would in principle be possible to employ the robot 12 for workpiece changing, if its working space also extends in front of the processing station 49, for example by using a type of robot which is not only rotatable about the axis 25 of rotation but also within its working space.

In the case of the processing machine 11 the spindles 30 are arranged along a straight line or a row axis 35 adjacent to each other with equal distances a from each other. In accordance with this grid or pattern, i. e. in the present case in a fixed row arrangement, the components of the supply storage means 21 of the robot 12 and of the tool magazine 24 designed so that the simultaneous changing of several tools 13 is possible.

The adjacent tool holders 31 are for example arranged with the distance a apart so that the spindles 30 may simultaneously perform tool changing at the tool magazine 24. Tool changing takes place as follows:

The slides 38 and 41 are so shifted that the spindles 30 are so positioned in relation to the pivotal arm 27 pivoted into the spindle access space 29 that the spindles 30 may firstly deposit spent or blunt tools 13 at free tool holders 31f (see FIG. 3c). The free tool holders 31f are arranged between the occupied tool holders 31b offering tools 13 so that the tool holders 31 are free and occupied in alternating succession, as may be seen from the FIGS. 3a through 3d. For tool changing the spindles 30 are in the top tool change position for example indicated in FIG. 1 with solid lines and in FIG. 2 in chained lines. The free tool holders 31f and the tool holders and the tool holders 31b having tools 13 are respectively spaced apart in accordance with grid pitch a. Accordingly the spindle group 37 can in groups initially and simultaneously deposit spent tools 13 at the free holders 31f, for example using detent catches, and then travel laterally in the X direction in order to position itself opposite the occupied tool holders 31 and to receive the tools 13 located there. FIGS. 3c and 3d indicate the pivotal arm 27 prior to and after receiving new tools 13 offered by the tool magazine 24. In FIG. 3d the spent tools 13 are arranged on the previously free (FIG. 3c) tool holders 31.

Then the pivotal arm 27 is swung back into the robot access space 28 in a reverse movement in accordance with FIG. 3b and then FIG. 3a. The range of pivoting of the pivotal arm 27 preferably extends over approximately 180 degrees and in the present case for example preferably approximately 270 degrees.

It is here that the robot 12 using the tool holding means 22 simultaneously takes all spent tools 13 from the tool magazine 24, because the tool holders 23 are arranged in accordance with the grid pitch a of the spindles 30 on the tool holding means 22. The robot 12 lays down the spent tools 13 in the storage supply means 21, for example in the one of the frames 16 through 20.

The frames 16 through 20 also keep to the grid pitch a or spacing. For instance the frames 16 through 20 possess tool holder groups 57 for the deposit of tools 13, in the case of which deposit positions for the tools 13 are spaced apart adjacent to grid pitch a. In the case of tools 13 whose width or diameter is less than half the grid pitch a, it is possible from the receiving means 58 to be spaced apart at a distance of for example a/2. This corresponds to the arrangement or, respectively, spacing of the tool holders 31 at the tool magazine 24 so that the robot 12 can firstly for example deposit spent tools 58 at free deposit sites or tool receiving means and in many cases retrieve tools 13 held directly adjacently in neighboring receiving means 58 of holder group 57 to the extent that the type of tool involved is just needed.

In the frame 20 tools 13 with a greater width or, respectively, a greater diameter are stocked so that the tool holder groups 57' of the frame 20 in the present embodiment may only each accept four tools 13, because the receiving means 58' of the tool holder groups 57' are wider than the distance a/2. In this case the robot 12 firstly dumps tools 13 at free receiving means 58' of a first tool holder group and then accepts new tools 13 from one of the frames 16 through 20 in order to position same in the tool magazine 24.

The frames 16 through 20 are at the front accessible for the robot 12 and open and are preferably closed at the rear. In the drawings the rear walls of the frames 16 through 20 are not illustrated for the sake of clarity. It is however expedient to provide closure means here so that the frames 16 through 20 may be armed with new tools 13 from the rear, i. e. outside the robot working space 14. On opening one of the closure means it is convenient for the entire processing machine arrangement 10 to be turned off in order to prevent injury to an operator changing tools. Furthermore as a protective feature the frames 16 through 20 constitute part of an enclosure 59 delimiting the robot working space 14. Between the frames 16 through 20 walls 60 are arranged that in cooperation with the frames 16 through 20 constitute a generally closed enclosure or barrier 59. For the sake of simplification the enclosure 59 is not completely illustrated. It is obviously possible for the enclosure 59 to completely surround the robot working portion or working space 14 so that unauthorized access during operation of the processing machine arrangement 10 is prevented.

A guard cover 63, only partially illustrated in the figures, surrounds the processing machine 11, an opening for the pivotal arm 27 being provided adjacent to the tool magazine 24, which is attached to the machine frame 48. Furthermore at the processing station 49 lateral openings 64 may be provided in the cover 63 so that a working portion of the processing machine 11 is accessible. A lateral opening 64 is able to be closed by a door arrangement 65.

The receiving means 58 and 58' do not necessarily have to be produced with a high degree of accuracy. More particularly, the holder groups 57 and 57' may be mounted or, respectively, welded on simply relative to each other on the frames 16 through 20, because the robot 12 may learn the corresponding positioning of the tools 13 in the frames 16 through 20 in a learning mode. A robot control 61 "remembers" the positions of the tools 13 in the frames 16 through 20 for later operation, i. e. for changing the tools 13. The storage supply means 21 is accordingly simpler and cheaper to manufacture.

The robot control 61 cooperates with a control 62 for the processing machine 11 in order to implement positioning tasks and tool change in a coordinated manner. In the case of the controls 61 and 62 it is a question for example of CNC controls or other computer controls. It will be clear that the robot control 61 and the processing machine control 62 may also be coupled together by a master control, not illustrated in the drawings, or may be replaced by a single control.

The pivotal arm 27 is available for tool changing either in the robot access space 28 or in the spindle access space 29 so that either the robot 12 or the processing machine 11 may perform a tool change. Simultaneous tool changing or an essentially simultaneous tool change both for the robot 12 and also for the processing machine 11 is possible in the case of a tool magazine 70 in accordance with FIGS. 4a through 4d, 5a and 5b. The tool magazine 70 is as an alternative to the tool magazine 24 on the processing machine 11 able to be more accurately arranged on its machine frame 48. For the simplification of the following description equivalent and similar components of the tool magazines 24 and 70 have the same reference numerals and for making differences clear are in part provided with an apostrophe.

A pivotal arm 27' is able to be swung between the robot access space 28 and the spindle access space 29. The pivotal arm 27' is pivotally or rotatably mounted on a holder 71 and is driven by a rotary or rocking drive 33'. A linear adjustability of the pivotal arm 27 is not provided for. On the other hand a second pivotal arm 72 is able to be linearly shifted and also rocked in relation to the holder 71. Holding portions 32' of the pivotal arms 27' and 72 are similar to the holding portion 32 so that the robot 12, as explained in connection with the tool magazine 24, may simultaneously deposit a plurality of tools 13 at the tool holders 31 and, respectively, pick up tools there.

The pivotal arm 72 is mounted for pivoting on a slide 73, which runs on guides 74 in a linear manner on the holder 71. The holder 71 is designed in the form of a sort of table with a top side (which is for example horizontal) on which the slide 73 runs in relation to the pivotal arm 27', in the working example in the Z direction. A linear drive 75, for example an electrical and/or pneumatic circulating ball drive, linear direct drive or the like drives the slide 73. The linear drive 75 constitutes a linear setting or adjusting means. The pivotal arms 27' and 72 are mounted in rocking manner on upwardly extending holder sections 76 of the holder 71 or, respectively, the slide 73.

A drive 33' for the pivotal arm 27' projects in the direction of the slide 73, i. e. in the Z direction, to the fore. A drive 77 is also orientated in the same direction for rotating or pivoting the rotary arm or, respectively, pivotal arm 72. The pivotal arm 72 is cranked. A cranked section 78 of the pivotal arm 72 extends past the drive 33 of the pivotal arm 27', for example in parallelism to the pivoting or rotational axis so that the pivotal arm 72 assumes substantially the same changing position in relation to the Z direction or, respectively, the linear setting direction as the pivotal arm 27', for example in relation to the spindle access space 29, as may be seen from FIGS. 4a and 4d.

The linear drive 75 or, respectively, the linear adjustability of the pivotal arm 72 in relation to the pivotal arm 27' renders possible a dodging movement of the two pivotal arms 27' and 72 when same are pivoted in opposite directions into the robot access space 28 and, respectively, the spindle access space 29 and come close to each other. In the case of the kinematically simpler design in accordance with FIGS. 4a through 4d the pivotal arm 72 is spaced clear of the pivotal arm 27' in the case of the tool change position, and for example in the drawing positioned to the fore toward the drive 75. Then the two pivotal arms 27' and 72 move past each other in the opposite direction, the pivotal arms 27' and 72 being so spaced apart at a linear distance of b that the two pivotal arms 27' and 72 together with the tools 13' arranged on them may be rocked past each other without colliding. The linear distance b takes into account for example the longitudinal extent of the tools 13, which in the working embodiment project to the fore in the direction of the pivotal arm 72. When the two pivotal arms 27' and 72 have moved past each other during a rotary movement, the slide 73 travels to the rear in the direction of the pivotal arm 27' as indicated by the arrow c so that the pivotal arm 72, in the tool change position in relation to the spindles 30 in the spindle access space 29, assumes the same position as previously (see FIG. 4a) occupied by the pivotal arm 27'.

It will be seen from FIG. 4a that as predetermined by the cranked section 78 a tool holder portion 32' of the pivotal arm 72 has assumed, as regards the Z direction, substantially the same position in the robot access space 28 as the corresponding tool holder portion 32 of the pivotal arm 27', see FIG. 4d. A further improvement is achieved however if, as indicated in FIG. 5a, the slide 73 is shifted toward the pivotal arm 27' also for a tool change of the robot 12 so that the robot 12—irrespectively of which of the pivotal arms 27' and 72 is in the tool change position in the robot access space 28—can move to the tool holder 31 of the tool holder portions 32' of the pivotal arms 27' and 72. Accordingly the positioning work of the part of the robot 12 is facilitated. In the case of this kinematically somewhat more involved but nevertheless expedient design the slide 73 travels, even prior to a tool change by the robot 12, in the direction of the pivotal arm 27' so that the robot 12 always conveniently finds the tools 13 to be changed at the same position (see FIG. 5a) and after tool changing by the robot 12 is shifted in the direction of an arrow d (see FIG. 5b) away from the pivotal arm 27' to avoid a collision of the pivotal arms 27' and 72 in the course of opposite rotation.

A processing machine arrangement 100 in accordance with FIGS. 6 and 7 has components partially identical to those employed in the processing machine arrangement 10, for example a robot 12 and a storage supply means 21. Instead of the processing machine 11 a processing machine 111 is provided, a guard cover of such processing machine 111 not along illustrated for the sake of simplification.

The processing machine 111 is also a multi-spindle machine for machining workpieces 52 and conveniently a milling machine, a drilling machine and/or a turning machine. A processing or machining station 149 comprises a workpiece table 150, designed for example in the form of a turntable, or some other device for offering workpieces, for example workpiece tables attached to a pivotal arm which are able to be pivoted in alternating succession to a position in front of tool spindles 130 of the processing machine 11. Shavings, metal turnings or the like produced during machining of workpieces 52 may be channeled to the side in waste troughs 151 and into a waste removal duct 152, where a shavings removal belt, not illustrated in the figure, or some other shavings removal means may be arranged. A guard shroud of the processing station 159 is not illustrated for reasons of simplification.

The spindles 130 are arranged horizontally superposed and can be individually shifted in the Z direction with the aid of guide arrangements 139 and linear drives 138, as for example linear direct drives, circulating ball drives or the like, in relation to the processing station 149.

A further possibility of horizontal setting or positioning, namely in the X direction, is implemented by a horizontal slide 141, which is able to be shifted using guides 142 on a base machine frame 148. The machine frame 148 is tower-like and, as it were, constitutes a framework on which the X slide 141 runs. The guide arrangements 142 are for example arranged on the front side of the machine frame 148, which extends upward over a base frame or, respectively, machine bed 136 of the processing machine 111.

On the X slide 141 a vertical slide or Y slide 145 runs on guides 146, which may be set in position by means of drives, not illustrated, in a vertical direction. The guides 146 are arranged to the side and in the present case adjacent to an opening 147 in the slide 141, there being on the front side lateral sections of the vertical slide 145 to cover over the guides 146. In the opening 147 the vertical slide 145 is, as it were, inserted so that the horizontal slide 141 surrounds the vertical slide 145 like a frame. This means that there is a high strength to resist twisting.

The tool spindles 130 are alternatingly arranged on opposite sides of an opening 144 in the vertical slide 145 so that a space saving arrangement is produced, in the case of which the axes of the spindles 130 are arranged vertically close together while on the other hand there is a comparatively wide support base for the guide arrangements 139.

The robot 12 arms a tool magazine 124 with tools 13, as has been described above in connection with the tool magazine 24. The tool magazine 124 is attached on the side, facing the robot 12, of the machine frame 148 by means of a holder 115 which may for example be angular. A holder means 116 having a base part 117 is rotatably mounted on the holder 115 and comprises several tool holder portions 132—in the working example four thereof—which are constituted by four outer sides of the disk- or plate-like base part 117, which possesses a substantially quadrilateral configuration. A drive 119, which constitutes a rotational setting means, drives the base part 117. The drive 119 turns respectively one of the tool holder portions 132 into the robot access space 28 and simultaneously another tool holder portion 132, located on an opposite side of the base part, into the spindle access space 29, where all spindles 130 may simultaneously get their tools 13 from the respective tool holder portion 132 and, respectively, deposit spent or blunt tools 13 there.

The base configuration of the tool holder portions 132 is the same as the configuration of the tool holder portions 32 of the pivotal arm 27, i. e. per tool spindle 130 there are two tool holders 131, corresponding to the holders 31. Respectively two tool holders 131 constitute a pair 133 of tool holders, of which one holder 131 is initially free for a tool change so that the associated tool spindle 130 may deposit a tool 13 there and is then driven to the adjacent tool holder 131 of the tool holder pair 133 in order to get a tool 13 already offered there.

It would be readily possible to have a design in which per tool holder portion less tool holders 131 are provided. If correspondingly large tools 13 are utilized, for instance the tools 13 held in the frame 20, it is possible furthermore for only every second tool holder 131 to be charged. Then the spindles 130 may deposit their currently held tools 13 firstly at a free tool holder portion 132. Then the base part 117 turns on farther through, for example on one quarter, so that the bulky tools 13 located there may be taken over by the spindles 130.

In the case of the arrangement depicted in FIGS. 6 and 7, in which the tool magazine 124 is loaded with comparatively small tools 13, the robot 12 transfers tools 13 to the table holder portion 132 turned or pivoted to face it, such transferred tools 13 being required for the respectively next-but-one tool change stroke on the spindles 130. The robot 12 and the spindles 130 may simultaneously use the tool holder portions 132, turned facing them, for a tool change.

It is clear that tool holder portions may be provided which have a different grouping or arrangement structure of tool holders 31 and 131, which preferably correlates with the grouped structure of the spindles 30 and 130, for example by having a zigzag line, a polygon or the like. Moreover differently designed multi-spindle machines, and possibly single spindle machines, may be armed effectively and speedily with tools. As an example furthermore a twin-spindle machine or a five-spindle machine could be armed with tools 13 in the manner described. To the extent that a larger capacity is desired for the tool magazine 24 and 124 serving as an intermediate buffer, it would for example be possible to provide pivotal arms or a differently designed base part 117 with further side portions, which are suitable as tool holder portions, as for example a hexagonal base part.

Furthermore as well kinematically complex systems may be employed in the case of tool magazines serving as intermediate tool buffers. Thus for instance the pivotal arms 27' and 72 could be respectively separately linearly guided so that further degrees of freedom as regards the linear adjustability of the two pivotal arms 27' and 72 would be produced. Each of the pivotal arms 27' and 72 would then run linearly on a separate associated holder corresponding to the holder 71 and would preferably be able to be set by a separate linear drive. It would even be possible to take a further step in this direction and design one or more of the pivotal arms (able to be shifted individually in the Z direction) for additional movement in the X direction, for example by means of additional slides, which are arranged on the Z slide. Then two translatory degrees of freedom, at a right angle to each other, would be created in addition to the pivotal degrees of freedom.

Moreover, it would be conceivable to economize in drives by providing one drive instead of several drives which via suitable transmissions performs several movements. For instance the drives 77 and/or 75 and/or 33' could be replaced by a single drive, which by way of a suitable transmission causes the corresponding rotary movements or, respectively, linear setting movements.

What is claimed is:

1. A processing machine arrangement comprising a processing machine with at least one tool spindle and with a tool magazine for offering tools to the processing machine for the machining of a workpiece, comprising a robot with a multi-joint robot arm for providing the tool magazine with tools from a tool storage supply means and for removing spent tools from the tool magazine, and that the tool magazine includes at least one tool holder portion which is alternatingly able to be shifted, and more especially pivoted, into a robot access space for a tool change of the robot and into a spindle access space for a tool change on the at least one tool spindle, such tool holder portion having at least one tool holder for holding a tool.

2. The processing machine arrangement as set forth in claim 1, wherein on the at least one tool holder pair a holder portion is arranged, of which for a tool change one tool holder is initially free for the deposit of a tool and the other tool holder offers a tool for retrieval by the at least one tool spindle or the robot.

3. The processing machine arrangement as set forth in claim 2, wherein the two tool holders of the at least one tool holder pair are directly juxtaposed to each other.

4. The processing machine arrangement as set forth in claim 2, wherein at least one tool holder pair is able to be set in position in relation to at least one tool spindle for positioning the free tool holder and of the tool holder offering a tool as regards the at least one tool spindle.

5. The processing machine arrangement as set forth in claim 2, wherein the tool holder pair is arranged in a settable manner on a base part of the tool magazine and/or the at least one tool spindle in relation to the tool holder pair.

6. The processing machine arrangement as set forth in claim 1, wherein the tool magazine comprises at least one rotational setting means for turning and/or at least one linear setting means for linearly setting the at least one tool holder portion.

7. The processing machine arrangement as set forth in claim 1, wherein the at least one tool holder portion is provided on at least one essentially dimensionally rigid base part.

8. The processing machine arrangement as set forth in claim 1, wherein said tool magazine includes at least one pivotal arm, on which at least one tool holding portion is arranged, said pivotal arms being able to be rocked out of the robot access space into the spindle access space and vice versa.

9. The processing machine arrangement as set forth in claim 1, wherein the tool magazine includes at least two tool holding portions able to be shifted in alternating succession into the robot access space and into the spindle access space so that the at least one tool spindle and the robot may substantially simultaneously change tools at respectively one tool holder portion.

10. The processing machine arrangement as set forth in claim 9 wherein the at least two tool holder portions, able to be brought alternatingly into the robot access space and the spindle access space are arranged on a first and at least one second pivotal arm, such arms being able to be pivoted in opposite directions into the robot access space and into the spindle access space.

11. The processing machine arrangement as set forth in claim 10, wherein the first and the at least one second pivotal arm are able to be linearly positioned in relation to each other so that when the pivotal arms draw together in the course of an opposite pivotal movement clearance is created by an avoidance movement of at least one pivotal arm.

12. The processing machine arrangement as set forth in claim 10, wherein the first pivotal arm is exclusively adapted for pivotal motion and the at least one second pivotal arm is adapted for pivotal movement and linear movement in relation to the first pivotal arm.

13. The processing machine arrangement as set forth in claim 10, wherein the first pivotal arm and the at least one second pivotal arm are, in essentially identical tool changing positions, able to be shifted for the at least one tool spindle within the spindle access space and/or for the robot within the robot access space.

14. The processing machine arrangement as set forth in claim 10 wherein the at least one second pivotal arm is cranked, one cranked section being adapted to run past a rotary bearing means, and more especially a rotary drive, of the first pivotal arm.

15. The processing machine arrangement as set forth in claim 9 wherein the at least two tool holder portions able to be shifted into the robot access space and into the spindle access space are more particularly oppositely set portions of a rotatable holding means, the at least two tool holder portions being able to be turned or pivoted by a rotary movement or pivotal movement simultaneously into the robot access space or, respectively, the spindle access space.

16. The processing machine arrangement as set forth in claim 15, wherein the holder means has a essentially polygonal and more particularly quadrilateral or round outline.

17. The processing machine arrangement as set forth in claim 1, wherein the tool magazine is arranged on a frame of the processing machine.

18. The processing machine arrangement as set forth in claim 1, wherein the processing machine is a multi-spindle machine having at least two tool spindles shiftable along a line and arranged adjacent to each other and the at least one tool holder portion possesses adjacent tool holders following said line so that the at least two tool spindles may get several tools from the tool holders or deposit them there.

19. The processing machine arrangement as set forth in claim 1, wherein the line is essentially straight.

20. The processing machine arrangement as set forth in claim 1, comprising a tool holding means arranged on the arm of the robot, such holding means including tool holder arranged in accordance with a configuration of the tool spindles of the processing machine, which is designed as a multi-spindle machine so that the robot may get a plurality of tools from the tool holders of the tool magazine or may deposit such tool there.

21. The processing machine arrangement as set forth in claim 1, wherein the storage supply means includes at least one more especially cabinet-like frame for the deposit of tools by the robot.

22. The processing machine arrangement as set forth in claim 21, wherein several frames are arranged in a ring around the robot within the access portion or range of the robot arm.

23. The processing machine arrangement as set forth in claim 21, wherein the at least one frame possesses several more especially vertically superposed and/or horizontally juxtaposed tool holder groups with tool holders arrayed in accordance with a configuration of the tool spindles of the processing machine designed in the form of a multi-spindle processing machine.

24. The processing machine arrangement as set forth in claim 1, wherein the robot is arranged in a robot working space toward which the at least one frame is open to the fore and is accessible for the robot and the at least one more particularly rearwardly closed frame constitutes a component of a enclosure for the robot working space.

25. The processing machine arrangement as set forth in claim 1, wherein the robot is provided for workpiece changing as regards workpieces to be processed and already processed by the processing machine.

26. A method for the operation of a processing machine arrangement comprising a processing machine with at least one tool spindle and a tool magazine for offering tools for the processing machine for processing a workpiece, wherein a robot having a multi-joint robot arm arms the tool magazine with tools taken from a tool storage supply means and takes spent tools from the tool magazine, and the tool magazine shifts and more especially rocks at least one tool holder portion with at least one tool holder for holding a tool in alternating succession into a robot access space for tool changing and into a spindle access space for a tool change as regards the at least one tool spindle.

* * * * *